US012348927B2

(12) United States Patent
Zeltzer et al.

(10) Patent No.: US 12,348,927 B2
(45) Date of Patent: Jul. 1, 2025

(54) CONTROL OF AN ELECTROSTATIC ACOUSTIC DEVICE

(71) Applicant: Waves Audio Ltd., Tel Aviv (IL)

(72) Inventors: Gabriel Zeltzer, Lapid (IL); Meir Shaashua, Tel Aviv (IL)

(73) Assignee: Waves Audio Ltd., Tel Aviv (IL)

( * ) Notice: Subject to any disclaimer, the term of this patent is extended or adjusted under 35 U.S.C. 154(b) by 0 days.

(21) Appl. No.: 18/440,981

(22) Filed: Feb. 14, 2024

(65) Prior Publication Data

US 2024/0187776 A1 Jun. 6, 2024

Related U.S. Application Data

(63) Continuation of application No. 17/925,642, filed as application No. PCT/IL2021/050536 on May 11, 2021, now Pat. No. 11,910,150.

(30) Foreign Application Priority Data

May 18, 2020 (GB) ..................................... 2007324

(51) Int. Cl.

| | |
|---|---|
| ***H04R 1/10*** | (2006.01) |
| ***G10K 11/178*** | (2006.01) |
| ***H04R 3/00*** | (2006.01) |
| ***H04R 3/06*** | (2006.01) |
| ***H04R 7/04*** | (2006.01) |

(Continued)

(52) U.S. Cl.

CPC ..... *H04R 1/1041* (2013.01); *G10K 11/17825* (2018.01); *G10K 11/17827* (2018.01); *H04R 1/1016* (2013.01); *H04R 1/1025* (2013.01); *H04R 1/1075* (2013.01); *H04R 3/06* (2013.01); *H04R 7/04* (2013.01); *H04R 7/18* (2013.01); *H04R 19/00* (2013.01); *H04R 19/02* (2013.01); *H04R 29/001* (2013.01);

(Continued)

(58) Field of Classification Search

CPC .. H04R 1/1041; H04R 1/1016; H04R 1/1025; H04R 1/1075; H04R 3/06; H04R 7/04; H04R 7/18; H04R 19/00; H04R 19/02; H04R 29/001; H04R 3/007; H04R 2430/01; H04R 2460/01; H04R 3/00; G10K 11/17825; G10K 11/17827; G10K 2210/3026; G10L 19/26

See application file for complete search history.

(56) References Cited

U.S. PATENT DOCUMENTS

2014/0241536 A1* 8/2014 Adams ................ H04R 29/003 381/59

* cited by examiner

*Primary Examiner* — Kenny H Truong

(74) *Attorney, Agent, or Firm* — Dr. Hanan Farber Patent Agent Ltd.

(57) ABSTRACT

Controlling operation of an electrostatic acoustic device including a membrane and an electrode disposed proximate to the membrane. A probe signal varying at radio frequency is injected into the electrode. A current or charge signal is detected by converting the current or charge signal to a modulated voltage signal. The current or charge signal includes an audio signal varying at audio frequencies modulating the radio frequency of the probe signal. The modulated voltage signal is demodulated to produce an audio output signal varying at audio frequency. The audio output signal is transformed to produce an error signal. A control signal is input to the electrostatic acoustic device responsive to the error signal. The control signal is configured to cancel at least in part a mechanical response of the membrane due to ambient noise.

20 Claims, 7 Drawing Sheets

(51) Int. Cl.

| | |
|---|---|
| ***H04R 7/18*** | (2006.01) |
| ***H04R 19/00*** | (2006.01) |
| ***H04R 19/02*** | (2006.01) |
| ***H04R 29/00*** | (2006.01) |

(52) U.S. Cl.

CPC ...... *G10K 2210/3026* (2013.01); *H04R 3/007* (2013.01); *H04R 2430/01* (2013.01)

CONTROL OF AN ELECTROSTATIC ACOUSTIC DEVICE

BACKGROUND

1. Technical Field

The present invention relates to electrostatic audio devices, including earphones and loudspeakers, and particularly the present invention relates to a control circuit for operating electrostatic devices.

2. Description of Related Art

In the art of high fidelity sound reproduction, the electrostatic loudspeaker has received attention because of inherent excellent sound quality and smooth response over wide frequency ranges. In such devices, a flexible sound producing membrane is positioned near an electrode, or in the case of a push-pull arrangement, a pair of electrodes, one on either side of the membrane. A direct current polarization potential is applied between the membrane and the electrodes, and an audio signal is superimposed on the electrodes, causing the membrane to move in response to the audio signal. Electrodes are acoustically transmissive so that sound produced by the moving membrane radiates outward through the electrode to the listening area.

Electrostatic devices are highly efficient both electrically and mechanically. Electrical impedance is high and decreases with increasing acoustic frequency. High electrical impedance results in very low operating currents and minimal electrical losses. Mechanically, there are no moving parts other than the moving membrane which is very light in weight. Electrostatic devices are therefore inherently more energy efficient than electrodynamic acoustic devices currently used in battery operated electronic devices.

Thus, there is a need for and it would be advantageous to have a small electrostatic device of high efficiency suitable for use in battery operated electronic devices with a control circuit configured for maximizing the membrane dynamic range of motion, controlling acoustic transparency of the electrostatic device and noise cancellation, and use of the same electrostatic device as a loudspeaker and also as a microphone.

BRIEF SUMMARY

Various control methods are disclosed herein for controlling operation of an electrostatic acoustic device including a membrane and an electrode disposed proximate to the membrane. The membrane is configured to respond mechanically to a varying electric field emanating from the electrode when a varying audio signal voltage is applied to the electrostatic acoustic device. A probe signal varying at radio frequency is injected into the electrode. A current or charge signal is detected by converting the current or charge signal to a modulated voltage signal. The current or charge signal includes an audio signal varying at audio frequencies modulating the radio frequency of the probe signal. The modulated voltage signal is demodulated to produce an audio output signal varying at audio frequency. The audio output signal is transformed to produce an error signal. A control signal is input to the electrostatic acoustic device, responsive to the error signal. The control signal is configured to force mechanical motion of the membrane to maintain a desired acoustic output. The audio output signal varying at audio frequency may be obtained by homodyne detection of the modulated voltage signal at radio frequency. Phase and frequency may be locked between the modulated voltage signal at radio frequency and a radio frequency carrier signal responsive to the probe signal at radio frequency. A synchronous signal may be generated, synchronous with a radio frequency carrier of the modulated voltage signal. The probe signal may be output responsive to the synchronous signal. Demodulation of the modulated voltage signal may be performed using a low pass filter. Alternatively, a sinusoid may be locally generated at radio frequency and the probe signal may be responsive to the locally generated sinusoid at radio frequency. The demodulation may be performed by rectification, followed by low-pass filtering to produce the audio output signal. The phase and amplitude of the control signal may be configured to cancel at least in part a mechanical response of the membrane due to ambient noise. The control signal may be configured to limit mechanical displacement of the membrane intended to protect from an electrostatic discharge between the membrane and the electrode or mechanical collapse of the membrane onto the electrode due to irreversible electrostatic pull. The control signal may be further configured to adjust acoustic transparency of the electrostatic acoustic device.

Various control circuits for controlling operation of an electrostatic acoustic device are disclosed herein. The electrostatic acoustic device includes a membrane and an electrode disposed proximate to the membrane. The membrane is configured to respond mechanically to a varying electric field emanating from the electrode when a varying audio signal voltage is applied to the electrostatic acoustic device. The control circuit includes an amplifier configured to inject a probe signal varying at radio frequency into the electrode. A detector is configured to detect a current or charge signal responsive to mechanical motion of the membrane. The current or charge signal includes an audio signal varying at audio frequencies modulating the radio frequency. The detector is configured to convert the current or charge signal to a modulated voltage signal. A demodulator is configured to demodulate the modulated voltage signal to produce an audio output signal varying at audio frequency. A transform circuit is configured to transform the audio output signal to produce an error signal. A controller is configured to input a control signal to the electrostatic acoustic device, responsive to the error signal. The control signal is configured to force mechanical motion of the membrane to maintain a desired acoustic output. The audio output signal varying at audio frequency may be obtained by homodyne detection of the modulated voltage signal at radio frequency. The control circuit may include a phase-locked loop configured to lock phase and frequency of the modulated voltage signal and a radio frequency carrier signal responsive to the probe signal at radio frequency. The phase-locked loop may include a voltage controlled oscillator configured to generate a signal synchronous with a radio frequency carrier of the modulated voltage signal. The synchronous signal may be input to an an amplifier configured to output the probe signal responsive to the synchronous signal. A low-pass filter may be configured to filter and to demodulate the modulated voltage signal to produce an audio output signal varying at audio frequency. Alternatively, a local oscillator may be configured to generate a sinusoid at radio frequency. The amplifier may be configured to input the sinusoid at radio frequency and output the probe signal with frequency corresponding to the sinusoid. The demodulator may include a rectifier and low-pass filter to produce the audio output signal. The phase and amplitude of the control signal may be configured to cancel at least in part a mechanical response of the membrane due to ambient noise. The control signal may be configured to limit mechanical displacement of the membrane intended to protect from an electrostatic discharge between the membrane and the electrode. The control signal may be further configured to adjust acoustic transparency of the electrostatic acoustic device.

BRIEF DESCRIPTION OF THE DRAWINGS

The invention is herein described, by way of example only, with reference to the accompanying drawings, wherein.

Figure 1:
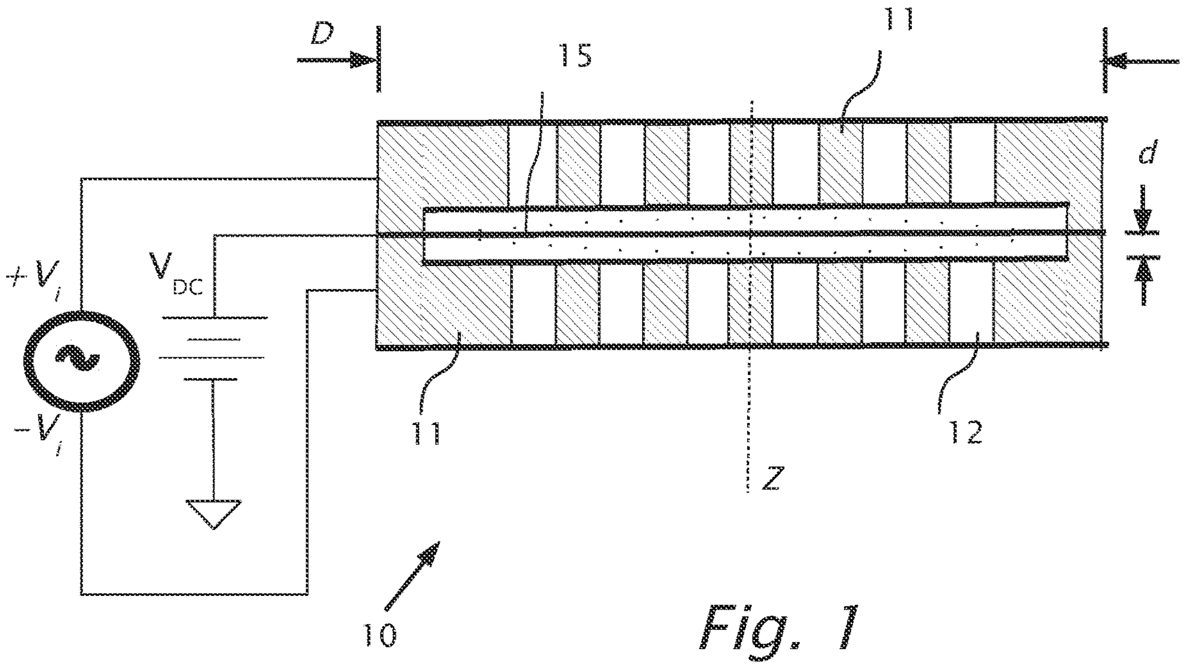
FIG. 1 illustrates schematically a cross-sectional view of an electrostatic device, according to features of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

By way of introduction, different aspects of the present invention are directed to a circuit for in-ear and/or over-ear electrostatic headphones, for controlling acoustic transparency and/or ambient noise cancellation. Circuits according to different features of the present invention may be directed to detector circuits for using the acoustic device as an electrostatic microphone. Circuits may be designed for an electrostatic speaker of maximum dimension, e.g. diameter D of 50 millimetres or less, or in some embodiments an electrostatic speaker of dimension D of 25 millimetres or less, or in yet other embodiments an electrostatic speaker of dimension D of 10 millimetres or less. For an earphone application, an electrostatic speaker may have maximum dimension, e.g. diameter D of 5 millimetres or less.

Other aspects of the present invention include use of a detector circuit for use of the electrostatic device as a loudspeaker and also as a microphone; optimising dynamic range and protection from over-driving the electrostatic device.

According to features of the present invention mechanical motion of the membrane is forced to maintain a desired acoustic output including: linearising motion of the membrane over at least a portion of a desired frequency range. Mechanical response of the membrane due to acoustic ambient noise may be cancelled at least in part, i.e. ambient noise control (ANC) may be performed. Similarly, acoustic transparency of the electrostatic acoustic device may be controlled. Prior art closed-loop controllers, e.g. ANC, generally employ a speaker and multiple microphones. According to embodiments of the present invention a single electro-acoustic device is sufficient to maintain a desired acoustic output.

Referring now to the drawings, reference is now made to FIG. 1, which illustrates schematically an electrostatic acoustic device 10, according to features of the present invention. Vertical axis Z is shown through a centre of acoustic device 10. A tensioned membrane 15 is supported, by edges of electrodes 11, essentially perpendicular to vertical axis Z. Membrane 15 may be impregnated with a conductive, resistive and/or electrostatic material so that membrane 15 responds mechanically to a changing electric field. The central regions of electrodes 11 are mounted proximate to, e.g. in parallel to, membrane 15, nominally equidistant, at a distance d, e.g. 20-500 micrometres from membrane 15. Electrodes 11 are illustrated as perforated with apertures 12 transmissive to sound waves emanating from membrane 15 when electrostatic acoustic device 10 is operating.

During operation of electrostatic acoustic device 10, a constant direct current (DC) bias voltage, e.g. $+V_{DC}=+100$ to +1000 volts, may be applied using a conductive contact to membrane 15. Alternatively, voltage signal $V_i$ may be applied to membrane 15 and electrodes 11 may be biased at $\pm V_{DC}$. Voltage signals $\pm V_i$ may be applied to electrodes 11. Voltage signals $\pm V_i$ may vary at audio frequencies, nominally between 20-20,000 Hertz. A non-inverted voltage signal $+V_i$ may be applied to one of electrodes 11 and an identical but inverted voltage signal $-V_i$ may be applied to the other electrode 11. Dotted lines illustrate schematically membrane 15 moving in response to a changing electric voltage due to voltage signals $\pm V_i$.

As distance d decreases, or as DC bias voltage $+V_{DC}$ and/or signal voltages $\pm V_i$ increase (in absolute value) then there is an increased chance for a short circuit between membrane 15 and electrode 11 and/or dielectric breakdown of air which is expected nominally at about $3\times10^6$ Volt/meter. According to a feature of the present invention, operation of electrostatic speaker may be controlled to avoid over-driving membrane 15.

Figure 2:
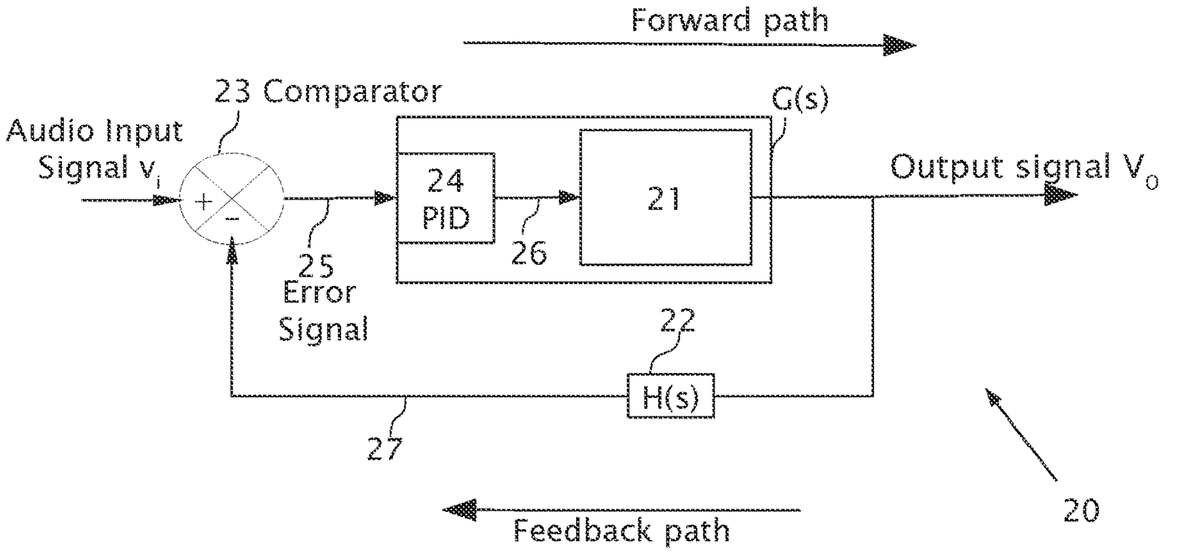
FIG. 2 is an electronic block diagram of a feedback control system, according to features of the present invention.

Reference is now made to FIG. 2, which illustrates a control system 20, according to features of the present invention. In the forward path, G(s) represents open loop gain of the control circuit including system 21, where s may be a complex variable representing an alternating voltage signal in the form $A(e^{i\omega t}+\varphi)$ where A represents an amplitude, $\omega=2\pi f$ represents an angular frequency, where f represents a frequency in Hertz and $\varphi$ represents a phase shift in radians. In the feedback path, block 22 represents transform function H(s) of an output voltage signal $V_o$. The feedback path output from feedback block 22 may output a signal 27, which may be subtracted by comparator 23 from the input signal $V_i$ to produce an error signal 25 which is input to controller block 21 so that the output signal $V_o$ approaches a set point. Overall transfer function of system 20, voltage output $V_o$ divided by voltage input $V_i$ of controller 21 may be modelled by equation 1:

$$V_o/V_i=G(s)/1+G(s)\cdot H(s) \quad (1)$$

Stability of control system 20 is contingent upon the denominator 1+G(s)·H(s) having sufficiently large absolute value and/or being non-zero. It is well known that in a resonant system 21, including a damped harmonic oscillator with an external drive that the response of an oscillator is in phase (i.e. $\varphi\approx0$) with the external drive for driving frequencies well below the resonant frequency, is in phase quadrature (i.e. $\varphi\approx\pi/2$) at the resonant frequency, and is anti-phase (i.e. $\varphi\approx\pi$) for frequencies well above the resonant frequency. If control system 21 includes a resonance and an oscillating energy source, then in order to maintain stability, the oscillating energy source operates either below or above the resonant frequency without ever crossing the resonant frequency. In case of resonance frequency cross-over, a phase shift filter may be added to mitigate the phase response discontinuity Reference is now made to FIG. 3, which illustrates schematically a controller 21A, an alternative for system 21 in FIG. 2, according to features of the present invention. Controller 21A includes electrostatic acoustic device 10 which may be configured to receive a high voltage audio input $+V_i$ at first electrode 11 and an inverted high voltage audio input $-V_i$ at second electrode 11 varying at audio frequencies intended for transduction into sound by electrostatic acoustic device 10. In addition, membrane 15 may respond mechanically as device 10 may behave as a capacitive microphone to undesirable ambient sound waves or noise.

Figure 6:
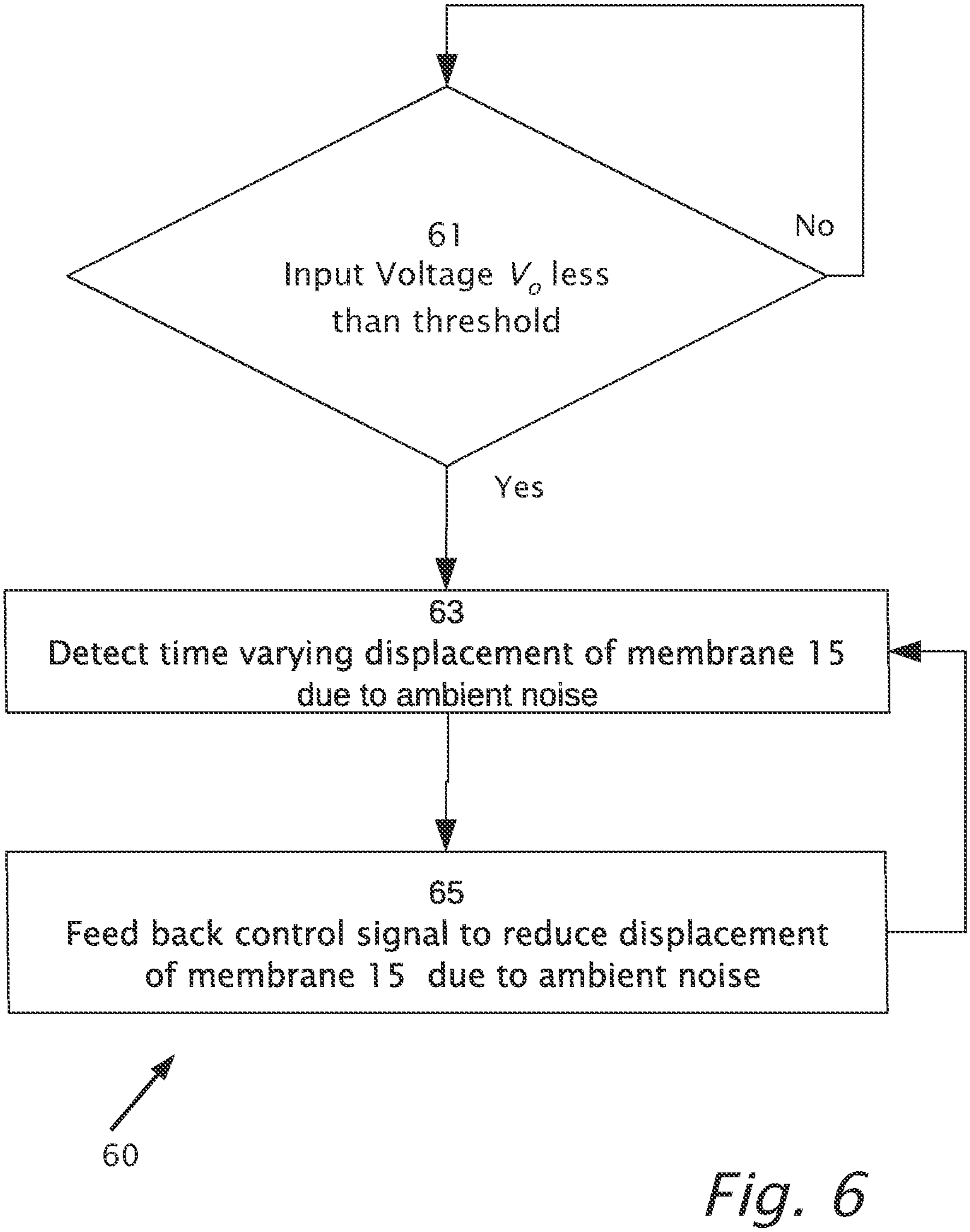
FIG. 6 is a flow diagram of a method, illustrating features of the present invention.

Reference is now also made to FIG. 6 which is a flow diagram 60 of a method illustrating features of the present invention. It would be advantageous to have control circuit 20 which, when input audio signals are less than a previously determined threshold (decision block 61), detects (step 63) the time varying displacement of membrane 15 and feeds back (step 65) a control signal 26 to acoustic device 10 to reduce the displacement of membrane 15 due to ambient noise. Thus, when electrostatic acoustic device 10 is used as an earphone and sealed into the ear canal, the mechanical displacement of the ear drum becomes coupled with the mechanical displacement of membrane 15, tending to actively cancel ambient noise otherwise sensed by the user.

In response to ambient noise, distance d between membrane 15 and electrodes 11 changes resulting in a change in capacitance C of electrostatic acoustic device 10. A changing current i(t) due to ambient noise may be sensed using a transimpedance amplifier 30, approximated by:

$$i(t)=V_{DC}dC/dt \quad (2)$$

Alternatively, a charge amplifier 30 may be considered, instead of a transimpedance amplifier, which integrates current i(t) to sense charge Q(t) which varies with changing capacitance of electrostatic acoustic device 10, and the sensed charge is converted to an output voltage signal.

Amplifier 30 may be configured to be inverting or non-inverting, and may have a band-pass of 600-900 Hertz, (−3 dB cut-off), centred out-of-band for audio frequencies, between 0.1-2 megahertz, and preferably far from any resonances of membrane 15. Voltage output of amplifier 30, may be added to a signal combiner or multiplier 32.

Figure 3:
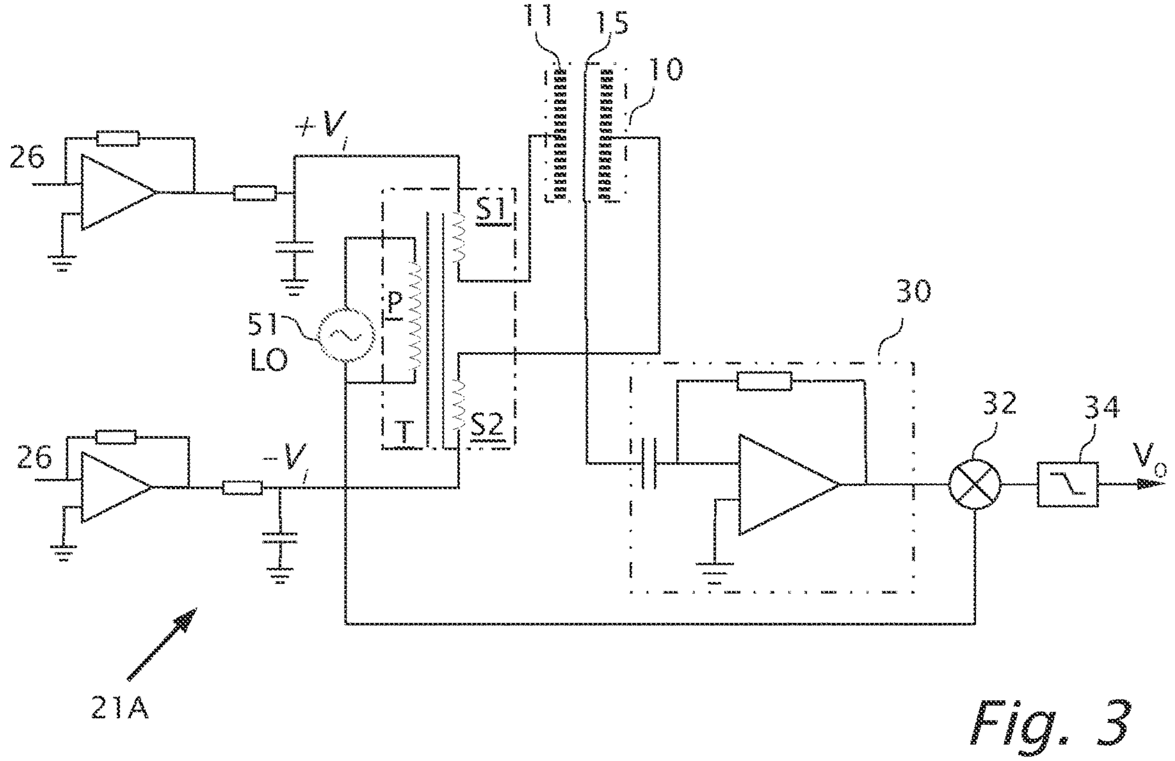
FIG. 3 is an electronic block diagram of a control system including an electrostatic acoustic device, in the forward path of the feedback control system of FIG. 2.

Still referring to FIG. 3, a probe signal from a local oscillator (LO) 51 at radio frequency, e.g. 0.1-2 megahertz may be coupled between the primary windings P of a transformer T Audio signal $+V_i$ and inverted audio signal $-V_i$ are fed respectively to electrodes 11 through series connected secondary windings S1 and S2 of transformer T. Audio signals $\pm V_i$ may be high voltage signals. Alternatively, audio signals $\pm V_i$ may be low voltage signals up to ~±20V with direct current high voltage applied to membrane 15 as shown in device 10 (FIG. 1). The probe signal produces a current which has a magnitude determined by the characteristic reactance of the electric circuit formed by the membrane 15 and electrode 11, essentially a variable capacitor. An advantage of using radio frequency is in the fact that radio frequency doesn't produce a perceptible mechanical motion but is modulated by the electrical change in capacitance which is related to the mechanical motion produced when an audio signal is present. Probe signal from local oscillator (LO) 51 may also be combined with the voltage output of amplifier 30 at signal combiner/multiplier 32. Signal combiner/multiplier 32 outputs to a low pass filter 34 which demodulates and transmits voltage output signal $V_o$, varying at audio frequencies. System 21A is a homodyne detection circuit which uses local oscillator 51 as a reference which is multiplied with the measured signal output of amplifier 30 at the same frequency. The base band or DC component of this multiplication includes the signal which is frequency converted from a narrow band around LO 52 frequency detected with a very high signal to noise ratio. Multiplier 32 may be implemented with analogue circuit AD835 from Analog Devices Inc (Norwood, MA, USA), by way of example.

Reference is now made again to FIG. 2, which illustrates voltage output signal $V_o$ transformed by feedback block 22. In response to the voltage output signal $V_o$, feedback block 22 may be configured to output signal 27 to comparator 23 which is subtracted from the input signal $V_i$. When input signal $V_i$ is nominally zero, signal 27 is added to become error signal 25. Alternatively, instead of comparator 23, a signal combiner 23 may be used and feedback block 22 appropriately transforms, e.g. inverts voltage output signal $V_o$ to signal 27 which becomes error signal 25.

Noise cancellation may be based on detection signal $V_o$ of position of membrane 15 which may be input as signal 27 to a feedback control mechanism 23,24. A second input is the control or set point signal which may be audio signal $v_i$ played by device 10.

System 20 may illustrate closed loop operation of electrostatic speaker 10 using lock-in detection signal $V_o$ for position of membrane 15 output from detection circuit 21A, by way of example.

Figure 2A:
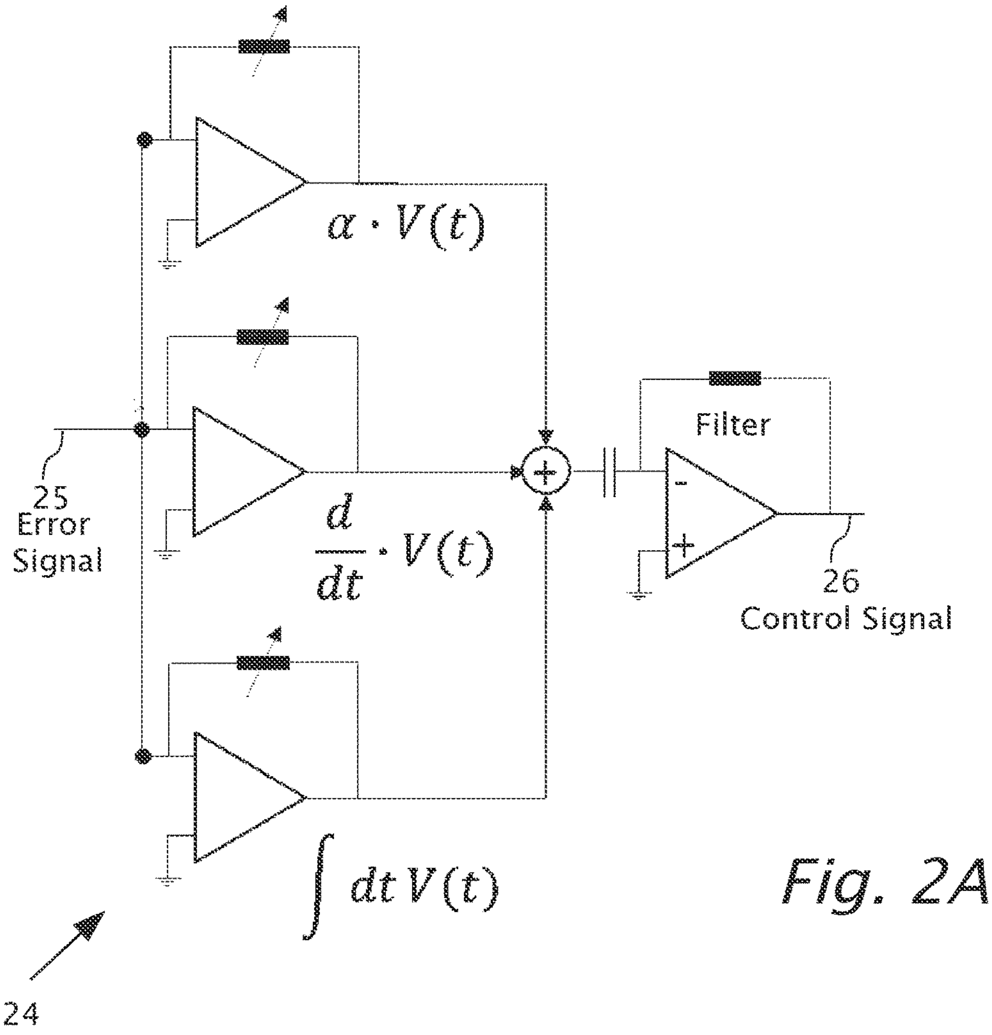
FIG. 2A illustrates an electronic block diagram of a proportional-integral-derivative controller (PID) controller, according to conventional art.

Reference is now also made to FIG. 2A, which illustrates a Proportional, Integral and Derivative (PID) block 24, according to conventional art. The feedback loop may include in the forward path G(s) a Proportional, Integral and Derivative (PID) block 24. Block 24 may include relative to error signal 25, a proportional gain, a differential and/or integration in linear combination as well as frequency filtering to output a control signal 26. For a null audio signal $v_i$, system 20 may act as a noise cancelling control system.

Feedback circuit 20 may be used to tune acoustic transparency of acoustic device 10 when used as an in-ear earphone or over-ear headset. Acoustic transparency is a measure of membrane 15 apparent stiffness, which controls the sound transmission coefficient from the outside space to the inner ear sealed volume through the boundary defined by membrane 15. Acoustic transparency may be controlled via electrostatic feedback actuation and position sensing with a variable gain as shown in block 21A and gain adjustments within PID 24, within the effective frequency bandwidth of the feedback actuation.

Controlling the ratio between the control signal 26 output from PID 24 and input audio signal $v_i$ using the PID gains allows a controlled audio noise cancellation and acoustic transparency (AT) adjustment within PID 24 effective bandwidth.

Figure 3A:
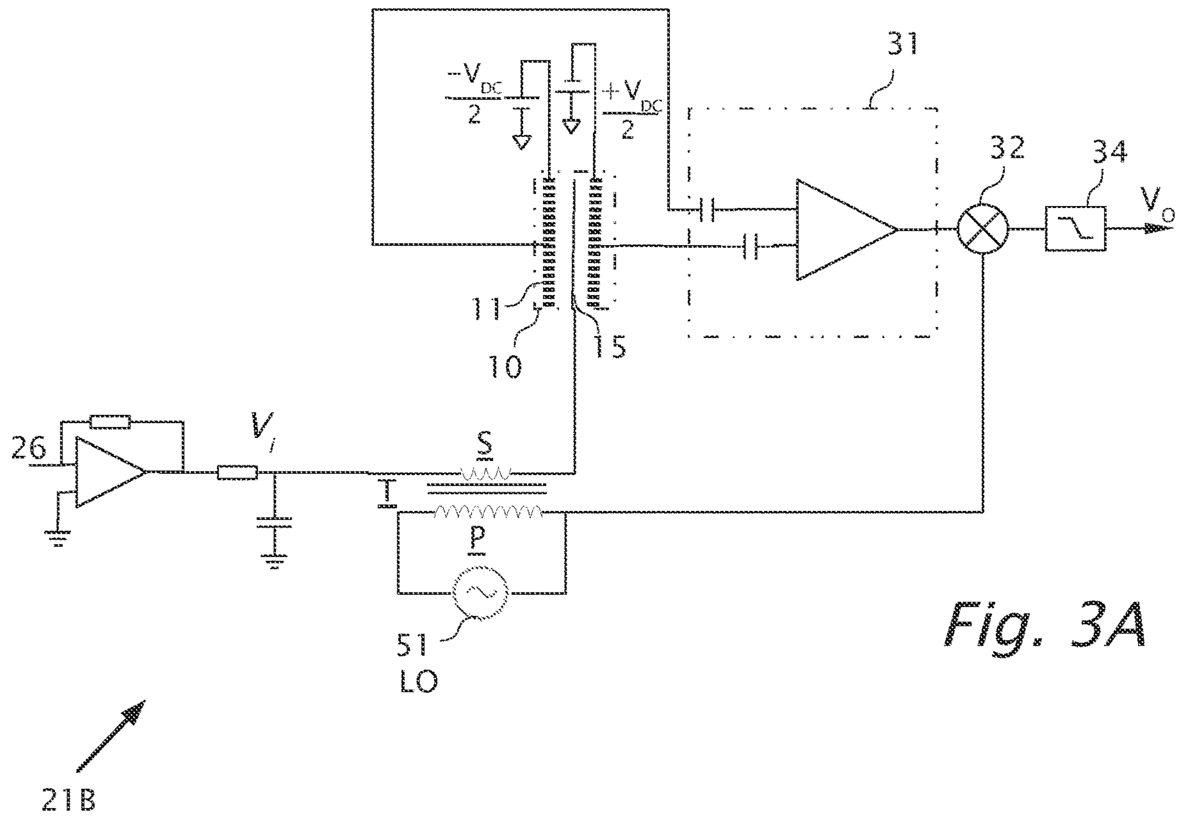
FIG. 3A is an alternative electronic block diagram of a control system including an electrostatic acoustic device, in the forward path of the feedback control system of FIG. 2

Reference is now made to FIG. 3A, which illustrates controller 21B, an alternative for system 21 (FIG. 2), according to features of the present invention. In controller 21B, audio voltage Vi may be applied to membrane 15. A probe signal from a local oscillator 51 may also be induced onto membrane 15 using a transformer T with primary P connected in parallel with local oscillator 51 and secondary S connected in series between audio voltage Vi and membrane 15. Bias voltage $V_{DC}$ is symmetrically applied on electrodes 11 with $-V_{DC}/2$ on a first electrode 11 and $+V_{DC}/2$ applied on a second electrode 11. A differential amplifier 31 may be used with inputs capacitively coupled respectively to electrodes 11. The voltage output of differential amplifier 31 varies with capacitance of device 10. Probe signal from local oscillator (LO) 51 may also be combined with the voltage output of differential amplifier 31 at signal combiner/multiplier 32. Signal combiner/multiplier 32 outputs to a low pass filter 34 which demodulates and transmits voltage output signal $V_o$, varying at audio frequencies. Differential amplifier 31 may be implemented using Texas Instruments/Burr-Brown™ INA105. According to features of the present invention controller 21B has an advantage over controller 21A because when a high voltage audio signal $V_i$ is used, one and not two high voltage input amplifiers are used.

Figure 4:
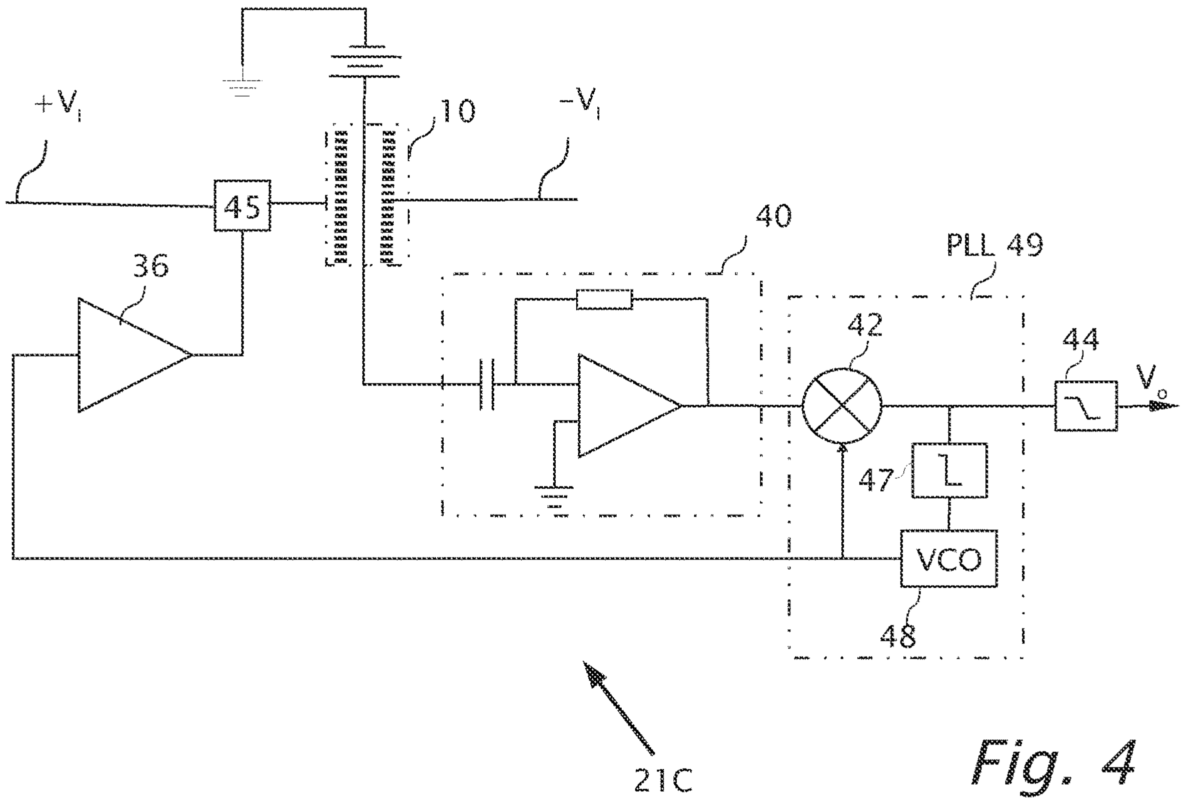
FIG. 4 is another alternative electronic block diagram of a control system in the forward path of the feedback control system of FIG. 2.
Figure 5:
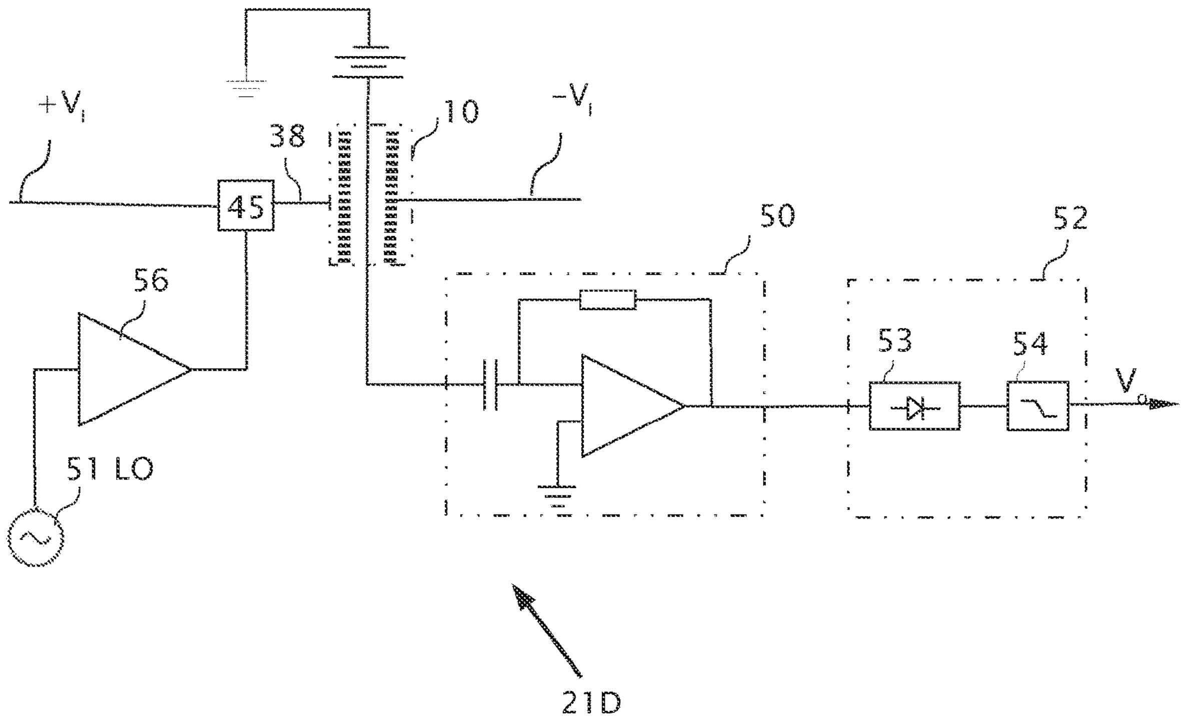
FIG. 5 is yet another alternative electronic block diagram of a control system in the forward path of the feedback control system of FIG. 2.

Reference is now made to FIG. 4, which illustrates schematically an alternative controller 21C, (FIG. 2, system block 21) according to features of the present invention. Controller 21C may be used for ambient noise minimisation or cancellation when input voltage signal $\pm V_i$ (absolute value) is less than a previously determined threshold. Amplifier 40 may be a charge amplifier or transimpedance amplifier. Amplifier 40 may be configured as amplifier 30 in circuit 21A to be inverting or non-inverting, and to have a bandpass of 600-900 Hertz, (−3 dB cut-off), centred out-of-band for audio frequencies, between 0.1-2 Megahertz, and preferably far from any resonances of membrane 15. Voltage output of amplifier 40, may be input to a signal combiner or multiplier 42, a component of phase-locked loop (PLL) 49. Phase locked loop 49 uses a local oscillator, i.e. voltage controlled oscillator (VCO) 48 which is compared to a measured signal, output from amplifier 40. The measured signal includes small changes in phase/frequency compared with VCO 48 output which are detectable at high signal to noise using a phase sensitive detector/demodulator, i.e. mixer 42 and low pass filter 44. A second input to signal combiner or multiplier 42 is an output of a voltage controlled oscillator (VCO) 48. Multiplier 42 may output to a narrow band loop filter 47 which outputs a direct current voltage in response to input RF carrier frequency. Voltage controlled oscillator (VCO) 48 outputs a radio frequency carrier responsive monotonically to the direct current voltage input from loop filter 47. Multiplier 42 and loop filter 47 act as a phase detector. PLL 49 is configured to stably lock when the inputs to multiplier 42 are of same frequency with a fixed phase difference. The carrier frequency output from voltage controlled oscillator (VCO) 48 is fed back to amplifier 36 which is coupled by a capacitive or inductive coupling 45 to an an input of acoustic electrostatic device 10 and injects a probe voltage signal into the input of acoustic electrostatic device 10 corresponding to the carrier frequency. PLL 49 also outputs to a low pass filter 44 to produce the voltage output signal $V_o$ sensitive to the relative and constant phase difference of the two inputs to mixer 42. Voltage output signal $V_o$ in control circuit 21C may then be transformed (block 22, FIG. 2) into an error signal 25 for active noise minimisation/cancellation. Alternatively, as in system 21B, detection as illustrated in FIG. 4 may be configured with a single audio voltage $V_i$ applied to membrane 15 and the probe signal from local oscillator 51 may also be induced onto membrane 15, Bias voltage $V_{DC}$ may be symmetrically applied on electrodes 11 with $-V_{DC}/2$ on a first electrode 11 and $+V_{DC}/2$ applied on a second electrode 11 and a differential amplifier may be used with inputs capacitively coupled respectively to electrodes 11. Reference is now made to FIG. 5, which illustrates schematically an alternative controller circuit 21D, (FIG. 2, system block 21) according to features of the present invention. A local oscillator (LO) 51 is configured to output a sinusoid of frequency, e.g. 1 Megahertz, between 0.1-2 Megahertz as input to an amplifier 56. During operation, amplifier 56 injects through capacitive or inductive coupling 45 into input 38 of device 10, a sinusoidal probe voltage corresponding to the input frequency output from oscillator LO 51. An audio input voltage signal $V_i$, if present, may be modulated around a carrier radio frequency, e.g. 1 Megahertz. Similarly, a noise signal from ambient sound internally generated in electrostatic acoustic device 10 may modulate the carrier frequency of LO 51.

Amplifier 50 may be a charge amplifier or transimpedance amplifier, may be configured as amplifier 30 in circuit 21A to be inverting or non-inverting, and to have a bandpass of 600-900 Hertz, (−3 dB cut-off), centred out-of-band for audio frequencies, between 0.1-2 Megahertz, and preferably far from any resonances of membrane 15

Voltage output of amplifier 50, may be input to detection block 52 which may include a rectifier 53 and a low pass filter 54 and outputs a voltage $V_o$ which may be transformed (block 22, FIG. 2) into error signal 25 for active noise minimisation/cancellation.

Protection Against Electrical Discharge and Over-Driving

Controller circuits 20, 21A, 21B, 21C and 21D may have further utility for protection of electrostatic acoustic device against unwanted dielectric breakdown of air or short circuit between electrode 11 and membrane 15. Unwanted dielectric breakdown of air or short circuit may occur if electrostatic acoustic device 10 is driven too hard and membrane 15 is displaced too close to electrode 11. In general, membrane 15 displacement may depend on several factors including the bias voltage $V_{DC}$, magnitude and frequency of input voltage signal $V_i$ and physical parameters of electrostatic acoustic device 10. When voltage output signal $V_o$ or certain frequency components thereof, have an amplitude over a previously determined frequency dependent threshold, controller circuit 20, 21A, 21B, 21C or 21D, particularly feedback path block 22 may be configured to cancel in part input voltage signal $v_i$ and protect against over-driving electrostatic acoustic device 10 or mechanical collapse of the membrane onto the electrode due to irreversible electrostatic pull.

Figure 7:
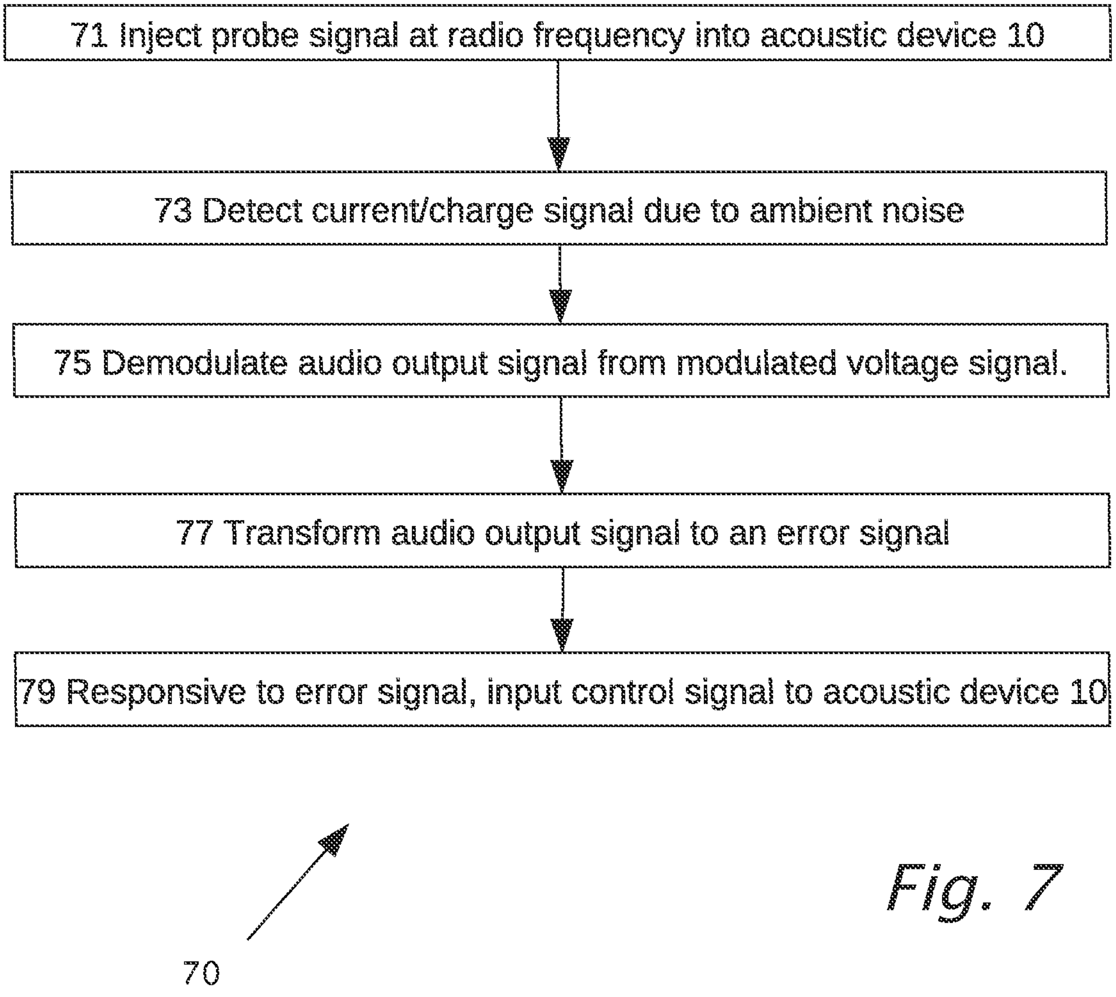
FIG. 7 is a flow diagram of a method, illustrating features of the present invention.

Reference is now made to FIG. 7, a flow diagram 70 of a method according to features of the present invention for controlling operation of an electrostatic acoustic device including a membrane 15 and an electrode 11 disposed proximate to membrane 15. Membrane 15 is configured to respond mechanically to a varying electric field emanating from electrode 11 when a varying audio signal voltage is applied to electrode 11. A probe signal varying at radio frequency is injected (step 71) into electrode 11. A current or charge signal is detected (step 73) by converting the current or charge signal to a modulated voltage signal. The current or charge signal includes an audio signal varying at audio frequencies modulating the radio frequency of the probe signal. The modulated voltage signal is demodulated (step 75) to produce an audio output signal varying at audio frequency. The audio output signal is transformed (step 77) to produce an error signal and responsive to the error signal, a control signal is input (step 79) to acoustic device 10.

The term "homodyne" as used herein refers to a method of detection/demodulation of a signal which is phase and/or frequency modulated onto an oscillating signal by combining that signal with a reference oscillation.

The term "phase sensitive detector circuit" as used herein is an electronic circuit including essentially a multiplier (or mixer) and a loop filter that produces a direct-current output signal that is proportional to the product of the amplitudes of two alternating-current input signals of the same frequency and to the cosine of the phase between them.

The term "transimpedance amplifier" as used herein converts current to voltage. Transimpedance amplifiers may be used to process current output of a sensor to a voltage signal output.

The term "charge amplifier" as used herein converts a time varying charge to a voltage output typically by integrated a time varying current signal.

The term "audio" or "audio frequency" refers to an oscillation rate of an alternating electric current or voltage or of a magnetic, electric or electromagnetic field or mechanical system in the frequency range 0-20,000 Hertz The term "audio signal", "audio output", "audio output signal" as used herein refer to an electrical signal varying essentially at audio frequency.

The term "radio frequency" (RF) is the oscillation rate of an alternating electric current or voltage or of a magnetic, electric or electromagnetic field or mechanical system in the frequency range from around twenty thousand times per second (20 kHz) to around three hundred billion times per second (300 GHz).

The term "transform" or "transforming" refers to phase shifting, inverting, amplifying and/or attenuating.

The term "error signal" as used herein refers to a voltage signal of magnitude proportional to or monotonic with the difference between an actual output signal varying at audio frequencies and a desired audio signal.

The term "control signal" as used herein refers to a signal input to an acoustic device, responsive to an error signal, to maintain a desired voltage output signal.

The transitional term "comprising" as used herein is synonymous with "including", and is inclusive or open-ended and does not exclude additional element or method steps not explicitly recited. The articles "a", "an" is used herein, such as "a circuit" or "an electrode" have the meaning of "one or more" that is "one or more circuits", "one or more electrodes".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The claimed invention is:

1. A method for controlling operation of an electrostatic acoustic device including a membrane and an electrode disposed proximate to the membrane, wherein the membrane is configured to respond mechanically to a varying electric field emanating from the electrode when a varying audio signal voltage is applied to the electrode, the method comprising:

injecting a probe signal varying at radio frequency into an input of the electrostatic acoustic device;

detecting a current or charge signal by converting the current or charge signal to a modulated voltage signal, wherein the current or charge signal includes an audio signal varying at audio frequencies modulating the radio frequency of the probe signal;

demodulating the modulated voltage signal to produce an audio output signal varying at audio frequency;

transforming the audio output signal to produce an error signal; and responsive to the error signal, inputting a control signal to the electrostatic acoustic device, wherein phase and amplitude of the control signal are configured to cancel at least in part a mechanical response of the membrane due to ambient noise.

2. The method of claim 1, wherein the audio output signal varying at audio frequency is obtained by homodyne detection of the modulated voltage signal at radio frequency.

3. The method of claim 1, further comprising:

phase and frequency locking the modulated voltage signal at radio frequency and a radio frequency carrier signal responsive to the probe signal at radio frequency.

4. The method of claim 1 further comprising:

generating a signal synchronous with a radio frequency carrier of the modulated voltage signal; and outputting the probe signal responsive to the synchronous signal.

5. The method of claim 1, wherein said demodulating the modulated voltage signal is performed using a low pass filter.

6. The method of claim 1, further comprising:

locally generating a sinusoid at radio frequency;

outputting the probe signal responsive to the locally generated sinusoid at radio frequency.

7. The method of claim 6, further comprising:

said demodulating by rectifying and low pass filtering to produce thereby the audio output signal.

8. The method of claim 1, wherein the control signal is configured to force mechanical motion of the membrane to maintain a desired acoustic output.

9. The method of claim 1, wherein the control signal is configured to limit mechanical displacement of the membrane.

10. The method of claim 1, wherein the control signal is further configured to adjust acoustic transparency of the electrostatic acoustic device.

11. A control circuit for controlling operation of an electrostatic acoustic device including a membrane and an electrode disposed proximate to the membrane, wherein the membrane is configured to respond mechanically to a varying electric field emanating from the electrode when a varying audio signal voltage is applied to the electrode, the control circuit comprising:

an oscillator configured to inject a probe signal varying at radio frequency into the electrostatic acoustic device;

a detector configured to detect a current or charge signal, the current or charge signal including an audio signal varying at audio frequencies modulating the radio frequency, wherein the detector is configured to convert the current or charge signal to a modulated voltage signal;

a demodulator configured to demodulate the modulated voltage signal to produce an audio output signal varying at audio frequency;

a transform circuit configured to transform the audio output signal to produce an error signal; and a controller configured to input a control signal to the electrostatic acoustic device, responsive to the error signal;

wherein phase and amplitude of the control signal are configured to cancel at least in part a mechanical response of the membrane due to ambient noise.

12. The control circuit of claim 11, wherein the audio output signal varying at audio frequency is obtained by homodyne detection of the modulated voltage signal at radio frequency.

13. The control circuit of claim 11, further comprising:

a phase-locked loop configured to phase and frequency lock the modulated voltage signal at radio frequency and a radio frequency carrier signal responsive to the probe signal at radio frequency.

14. The control circuit of claim 11, further comprising:

a voltage controlled oscillator configured to generate a signal synchronous with a radio frequency carrier of the modulated voltage signal.

15. The control circuit of claim 14, further comprising:

an amplifier configured to output the probe signal responsive to the synchronous signal.

16. The control circuit of claim 11, further comprising:

a low-pass filter configured to filter and to demodulate thereby the modulated voltage signal to produce an audio output signal varying at audio frequency.

17. The control circuit of claim 11, further comprising:

a local oscillator configured to generate a sinusoid at radio frequency;

wherein the amplifier is configured to input the sinusoid at radio frequency and output the probe signal with frequency corresponding to the sinusoid.

18. The control circuit of claim 17, wherein the demodulator includes a rectifier and low-pass filter to produce the audio output signal.

19. The control circuit of claim 11, wherein the control signal is configured to force mechanical motion of the membrane to maintain a desired acoustic output.

20. The control circuit of claim 11, wherein the control signal is configured to limit mechanical displacement of the membrane.

* * * * *